United States Patent [19]

Brenneisen et al.

[11] 3,792,974
[45] Feb. 19, 1974

[54] PROCESS FOR PREPARATION OF FAST DYEINGS OF PRINTS ON SYNTHETIC FIBER MATERIALS

[75] Inventors: Erich Brenneisen, Hofheim/Taunus; Ernst Hoyer, Frankfurt/Main; Maria Kallay, Mammolshain/Taunus; Karl-Heinz Krell, Kronberg/Taunus; Willi Steckelberg, Hofheim/Taunus, all of Germany

[73] Assignee: Farbwerke Hoechst Aktiengesellschaft vormals Meister Lucius & Bruning, Frankfurt, Germany

[22] Filed: Feb. 22, 1973

[21] Appl. No.: 334,836

[30] Foreign Application Priority Data
Feb. 26, 1972 Germany............................ 2209209

[52] U.S. Cl............................ 8/41 C, 8/41 R, 8/71, 8/94, 260/193
[51] Int. Cl. ......................... D06p 3/60, C09b 29/32
[58] Field of Search . 8/41 R, 41 C, 71, 94; 260/193

[56] References Cited
UNITED STATES PATENTS
2,211,339  8/1940  McNally et al. ..................... 260/193
FOREIGN PATENTS OR APPLICATIONS
407,368  8/1966  Switzerland........................ 260/193

Primary Examiner—Donald Levy
Assistant Examiner—Bruce H. Hess
Attorney, Agent, or Firm—Curtis, Morris & Safford

[57] ABSTRACT

A process for the preparation of fast dyeings or prints on synthetic fibrous materials which comprises treating the said fibrous materials in aqueous dispersion or in an organic solvent with dyestuffs of the formula

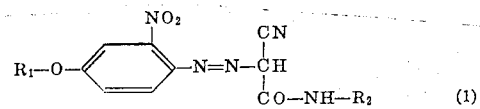

in which $R_1$ represents alkyl from one to four carbon atoms being unsubstituted or substituted by methoxy or ethoxy, and $R_2$ represents phenyl being unsubstituted or substituted by fluorine, chlorine, bromine, alkyl or one to four carbon atoms, alkoxy of one to four carbon atoms, trifluoro-methyl, nitro, hydroxy, cyano, carbo(lower)alkoxy, acetyl, benzoyl, phenyl or phenoxy, the yellow dyeings or prints so obtained being distinguished by excellent fastness properties, particularly by a very good fastness to light and a high fastness to sublimation.

11 Claims, No Drawings

PROCESS FOR PREPARATION OF FAST DYEINGS OF PRINTS ON SYNTHETIC FIBER MATERIALS

The present invention relates to a process for the preparation of fast dyeings or prints on synthetic fiber materials, wherein said fiber materials are treated with dyestuffs of the general formula (1)

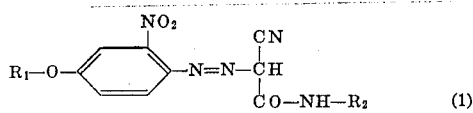

in which $R_1$ represents an alkyl group having one to four carbon atoms which may be substituted by a methoxy or ethoxy group, and $R_2$ stands for a naphthyl radical or a phenyl radical which may be substituted by a halogen atom, an alkyl and/or alkoxy group, each having one to four carbon atoms, a trifluoromethyl, nitro, hydroxy, cyano, carbalkoxy, acetyl, benzoyl, phenyl and/or phenoxy group in an aquous dispersion or in an organic solvent.

Dyestuffs of the general formula (2)

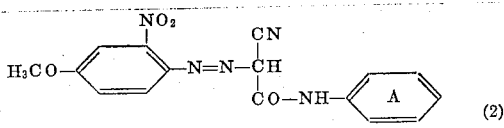

in which the benzene radical A is substituted by a fluorine, chlorine or bromine atom, a nitro, trifluoromethyl, hydroxy, alkyl and/or alkoxy group having one to four carbon atoms.

The dyestuffs may also be used in mixture with each other or with other dyestuffs.

On principle, the novel dyestuffs used according to the process of the invention are prepared in known manner by diazotizing a diazo component of the general formula (3), preferably the 3-nitro-4-aminoanisole of the formula (4)

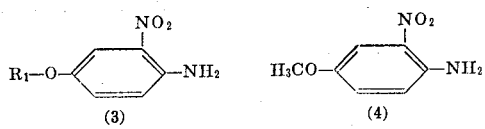

for example in a solution or suspension of a mineral acid with nitrite and coupling with a coupling component of the general formula (5), preferably of the general formula (6)

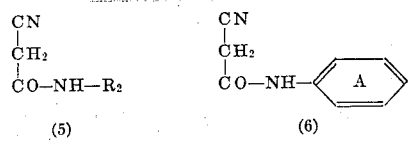

for example in a weakly alkaline, neutral or acid solution or suspension.

In the above formulae (3), (5) and (6), $R_1$, $R_2$ and A are defined as above.

As synthetic fiber materials, there are mentioned, for example, fibers made from cellulose esters, polyesters, polyamides, polyurethanes, polyolefins and polyacrylonitriles, preferably cellulose esters, such as cellulose acetate and cellulose triacetate; especially fibers made from polyesters, such as polyethylene terephthalate. The synthetic fiber materials may also be blended with each other or with natural fibrous materials, such as cellulose fibers or wool. These materials may furthermore be dyed or printed in various processing forms, for example as combed material, flakes, filaments, knit or woven fabrics.

The dyestuffs used according to the invention are applied, on principle in known manner, generally from an aqueous dispersion but also from an organic solvent. The dyestuffs may be dispersed, for example by grinding them in the presence of a dispersing agent, such as a condensation product of formaldehyde and a naphthalene-sulfonic acid.

Otherwise, the dyeing conditions depend, to a large extent, on the type of synthetic fiber materials and their processing form.

For example, shaped articles made of cellulose acetate are dyed at a temperature ranging from about 75° to about 85°C, whereas cellulose triacetate fibers are dyed at a temperature of from about 90° to about 125°C.

As to a polyamide fiber material, the dyestuffs are applied at a temperature of from about 90° to about 120°C. Polyester fiber materials are dyed according to known methods in the presence of carriers, such as ortho or para-phenyl-phenol, methyl-naphthalene or methyl-salicylate, at a temperature of about 100° to about 130°C, or in the absence of carriers at higher temperatures, for example between 120° and about 140°C. Moreover, according to the present process, the dyestuffs may also be applied to the said fibrous materials by pad-dyeing with or without a thickening agent, for example, a tragacanth thickener, and fixed under the action of heat, for example, by means of vapor or dry heat over about half a minute to 30 minutes at a temperature of from about 100° to about 230°C. In order to improve the fastness to rubbing, the material thus dyed is then freed from dyestuff adhering to its surface, for example, by washing or subjecting it to a reductive after-treatment. This reductive after-treatment is generally performed at about 60° to about 120°C in a liquor containing an aqueous sodium hydroxide solution, sodium dithionite and a non ionic detergent, for example an addition product of ethylene oxide and phenol.

For the dyeing of synthetic fiber materials from organic solvents, the dyestuff may, for example, be allowed to be absorbed by the fiber from the solution at room temperature or at an elevated temperature, preferably at about 70° to about 130°C, where required under pressure, or a knit or woven fabric may be impregnated in a continuous operation with a dyestuff solution, dried and exposed to heat for a short time, for example at a temperature of from about 180° to about 210°C.

As solvents to be used for the exhaustion method, there may, for example, be mentioned solvents which are not miscible with water and have boiling points of about 40° to about 170°C, such as aliphatic halogenated hydrocarbons, for example methylene chloride, trichloro-ethane, trichloro-ethylene, perchloro-ethylene or trifluoro-trichloro-ethane. For a continuous dyeing operation, there may especially be used water-miscible solvents, for example alcohols or dimethylformamide. The solvents may, of course, also be used in mixture with each other and may contain further adjuvants which are soluble in solvents, for example oxyalkylation products of fatty alcohols, alkyl-phenols and fatty acids.

For the production of prints on synthetic fiber materials, for example those made from polyesters, polyamides or cellulose triacetate, the dyestuffs to be used according to the invention may be applied in the form of aqueous compositions which may contain suitable thickeners and fixation-promoting agents in addition to the finely divided dyestuffs. Fixation is performed, for example after printing and drying, by means of steaming under atmospheric pressure or under elevated pressure of up to 2.5 atmospheres gage over 10 to 60 minutes. Fixation may also be brought about by the action of hot air of about 160° to about 210°C for a period of 30 seconds to 10 minutes.

The novel dyestuffs to be used according to the invention afford yellow dyeings and prints having excellent fastness properties. The dyeings and prints obtained by the present process are particularly distinguished by very good fastnesses to light and very good dyestuff yields, and also by a high fastness to sublimation.

As against dyeings and prints which may be obtained with the next comparable dyestuffs disclosed in U.S. Pat. Specification No. 2.211.339 and Swiss Pat. Specification No. 407 368, the dyeings and prints obtained according to the process of the present invention have superior properties, particularly a better affinity on polyester fiber materials and better properties of fastness such as fastness to light and thermofixation.

The following examples illustrate the invention, the parts and percentages being by weight unless stated otherwise, the parts by volume are to the parts by weight as liter to kilogram under normal conditions.

EXAMPLE 1

10 Parts of polyester fabric were introduced into a dye-bath heated to 50°C and containing 400 parts of softened water and 0.2 part of the dyestuff of formula (7)

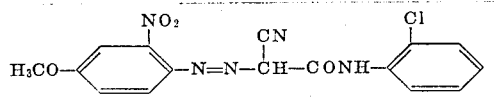

(7)

in finely divided form.

The pH-value of the dyebath was adusted to 5-5.5 by means of ammonium sulfate and acetic acid. Within 40 to 60 minutes, the temperature was raised to 130°C and the material was then dyed for 1 hour at this temperature.

The fabric was then taken out of the bath, rinsed and subjected to a reductive after-treatment for 20 minutes at 80° to 90°C in a bath containing, per liter, six parts of sodium hydroxide solution (38° Be), four parts of sodium dithionite and one part of a non-ionic detergent. The dyed fabric was finally rinsed and dried.

A yellow dyeing having outstanding properties of fastness was obtained, especially an excellent fastness to light and a high tinctorial strength.

Similar results were obtained when using instead of a polyester fabric a fabric of cellulose triacetate and carrying out the dyeing at 110°C.

Dyeings having the same good properties of fastness were also obtained by dyeing polyester yarn for 30 minutes at 120°C in a closed apparatus with the dyestuff of the formula (7) from perchloroethylene.

The dyestuff of the aforementioned formula (7) was obtained as follows:

33.6 parts of 3-nitro-4-amino-anisole were dissolved in the heat in 400 parts of water and 120 parts of 5N-hydrochloric acid and, after pouring onto 2,000 parts of ice water, diazotized with 40 parts by volume of a 5N sodium nitrite solution.

40.8 parts of the coupling component 2-chloro-cyanoacet-anilide were dissolved at room temperature in 800 parts of water and 54 parts of colume of a 33 percent aqueous sodium hydroxide solution and, after adding two parts of a non-ionic emulsifier such as the reaction product of oleyl alcohol and 30 mols of ethylene oxide, precipitated in finely divided form, while stirring, by rapidly adding 40 parts by volume of glacial acetic avoid.

The diazo solution was then added and the pH-value was adjusted to about 6.5 by means of sodium hydroxide solution.

The precipitated dyestuff was isolated by filtration and washing. It could be dried or brought into a finely divided dispersion, in the form of the aqueous filter residue and by means of a commercial dispersing agent, for example a condensation product of formaldehyde and a naphthalene-sulfonic acid.

EXAMPLE 2

10 Parts of polyester yarn were introduced into a dyebath heated to 60°C and containing 300 parts of softened water, 0.3 part of the finely divided dyestuff of the formula (8)

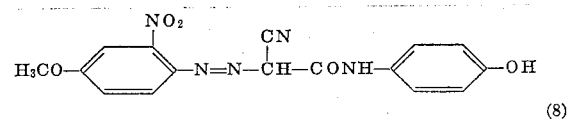

(8)

one part of a commercial carrier, for example o-phenylphenol, and 0.5 part of ammonium sulfate.

The pH-value of the dyebath was adjusted to 5 to 5.5 by means of acetic acid. Within 30 to 60 minutes, the temperature was raised to boiling temperature and the material was dyed for 90 minutes at this temperature.

The dyed material was then after-treated and finished as described in Example 1.

In this manner reddish yellow dyeings were obtained which possessed very good properties of fastness and a high color yield.

The dyestuff of the formula (8) was obtained by using as coupling component 35.9 parts of 4-hydroxy-cyanoacet-anilide and proceeding otherwise as described in Example (1).

EXAMPLE 3

A mixed fabric of polyester and cellulose was impregnated at 25 to 30°C with a dyeing liquor the pH value of which was adjusted to 5 to 5.5 by means of acetic acid and which contained the finely divided dyestuff of the formula (9).

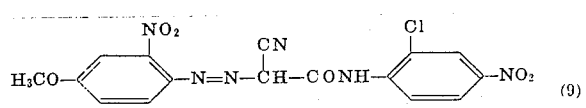

(9)

The material was then dried at a temperature of from 100° to 110°C. Fixation was brought about by dry heat for 30 to 90 seconds at 190° to 230°C. Finally, the fabric was subjected to a reductive after-treatment as described in Example 1 and finished.

An intense yellow dyeing having excellent properties of fastness, especially a very good fastness to light, was obtained. Similar high-quality dyeings were obtained by dyeing cellulose triacetate fiber materials in the same manner.

The dyestuff of the formula (9) was obtained using as coupling component 49.5 parts of 2-chloro-4-nitro-cyanoacet-anilide and otherwise following the treatment as disclosed in Example 1.

EXAMPLE 4

A polyester fabric was printed with a printing paste containing, per 1,000 parts, in addition to a commercial thickener, such as alginate and starch ether, as well as further usual additives, 200 parts of an aqueous dyestuff composition containing 10 percent of the finely divided dyestuff of the formula (10)

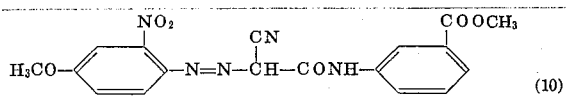

and then dried.

The dyestuff was then fixed for 60 seconds at 200°C by hot air.

The print was rinsed, subjected to a reductive after-treatment in a bath containing sodium dithionite and sodium hydroxide solution, then cleaned again in another bath containing a non-ionic detergent, for example the condensation product of nonylphenol and 10 mols of ethylene oxide, rinsed again and dried.

A yellow print having a high color intensity and excellent properties of fastness, particularly an outstanding fastness to thermofixation and light, was obtained. Similar good results were obtained by carrying out the fixation for 20 minutes by means of pressurized steam of 2 atmospheres gage.

When, instead of a polyester fabric, a fabric of cellulose triacetate was used, for which no reductive after-treatment was necessary, color-intense prints having very good fastness properties were likewise obtained.

The dyestuff of the formula (10) was obtained by using as coupling component 44.5 parts of 3-carbomethoxy-cyanoacetanilide and otherwise following the treatment disclosed in Example 1.

EXAMPLE 5

A fabric of polyester fibers was printed with a printing paste according to Example 4, containing, however, the dyestuff of the formula (11)

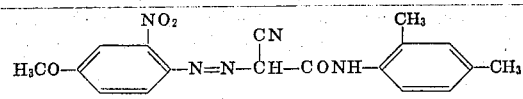

and then dried.

The fixation was carried out by steaming under atmospheric pressure for 30 minutes.

After cleaning and drying, a yellow print having a high color intensity and good fastness properties was obtained.

Valuable prints were also obtained using, instead of a fabric made of polyester fibres, a fabric of cellulose acetate fibers.

The dyestuff of the formula (11) was obtained using as coupling component 38.4 parts of 2,4-dimethyl-cyanoacetanilide and otherwise following the treatment disclosed in Example 1.

The following Table comprises further dyestuffs of the formula (1)

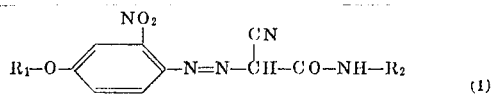

to be used according to the invention.

| Ex. No. | $R_1$ | $R_2$ | Shade on polyester fibers |
|---|---|---|---|
| 6 | $CH_3$ | 3-trifluoromethyl-phenyl | yellow |
| 7 | $CH_3$ | 2-bromo-phenyl | yellow |
| 8 | $CH_3$ | 4-t-butylphenyl | yellow |
| 9 | $CH_3$ | 2-nitro-phenyl | yellow |
| 10 | $CH_3$ | 2,4-dinitro-phenyl | yellow |
| 11 | $CH_3$ | 4-nitro-2,6-dichloro-phenyl | yellow |
| 12 | $CH_3$ | 4-methoxy-phenyl | yellow |
| 13 | $CH_3$ | α-naphthyl | reddish yellow |
| 14 | $CH_3$ | 3-benzoyl-phenyl | yellow |
| 15 | $CH_3$ | 2-phenoxy-phenyl | yellow |
| 16 | $CH_3$ | 4-bisphenyl | yellow |
| 17 | $C_2H_5$ | 4-chloro-phenyl | yellow |
| 18 | $C_2H_5$ | 2-chloro-4-nitro-phenyl | yellow |
| 19 | $C_2H_5$ | 4-hydroxy-phenyl | reddish yellow |
| 20 | $C_2H_5$ | 4-i-propyl-phenyl | yellow |
| 21 | $C_2H_5$ | 4-n-butoxy-phenyl | yellow |
| 22 | $C_3H_7$ | 4-hydroxy-phenyl | reddish yellow |
| 23 | $C_3H_7$ | 4-fluoro-phenyl | yellow |
| 24 | $C_3H_7$ | 4-ethoxy-phenyl | yellow |
| 25 | n-$C_4H_9$ | 2,4,5-trichloro-phenyl | yellow |
| 26 | n-$C_4H_9$ | phenyl | yellow |
| 27 | n-$C_4H_9$ | 4-hydroxy-phenyl | reddish yellow |
| 28 | n-$C_4H_9$ | 3-acetyl-phenyl | yellow |
| 29 | n-$C_4H_9$ | 4-ethyl-phenyl | yellow |
| 30 | $CH_3OC_2H_4$– | 2-chloro-phenyl | yellow |
| 31 | $CH_3OC_2H_4$– | 4-methoxy-phenyl | reddish yellow |
| 32 | $CH_3OC_2H_4$– | 3-cyano-phenyl | yellow |
| 33 | $CH_3OC_2H_4$– | 4-hydroxy-phenyl | reddish yellow |
| 34 | $CH_3OC_2H_4$– | 2-chloro-4-nitro-phenyl | yellow |
| 35 | $C_2H_5OC_2H_4$– | 4-hydroxy-phenyl | reddish yellow |
| 36 | $C_2H_5OC_2H_4$– | 2-nitro-4-trifluoro-methyl-phenyl | yellow |

We claim:

1. A process for the preparation of fast dyeings or prints on synthetic fibrous materials which comprises treating the said fibrous materials in a dye bath selected from the group consisting of an aqueous dispersion, an organic solvent and mixtures thereof with a dyestuff of the formula

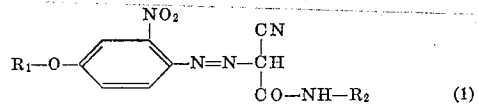

in which $R_1$ represents alkyl from one to four carbon atoms being unsubstituted or substituted by methoxy or ethoxy, and $R_2$ represents phenyl being unsubstituted or substituted by fluorine, chlorine, bromine, alkyl of one to four carbon atoms, alkoxy of one to four carbon atoms, trifluoromethyl, nitro, hydroxy, cyano, carbo(-lower)alkoxy, acetyl, benzoyl, phenyl or phenoxy, or combinations of two or three members thereof, or naphthyl.

2. A process as claimed in claim 1, wherein the synthetic fibrous materials consist of celluloseacetate or polyester.

3. A process as claimed in claim 1, wherein the said fibrous materials are dyed with an aqueous dispersion of the said dyestuffs between about 75°C and about 140°C in the absence or in the presence of a carrier.

4. A process as claimed in claim 1, wherein the said fibrous materials are dyed with the said dyestuffs from organic solvents between room temperature and about 130°C.

5. A process as claimed in claim 1, wherein the said fibrous materials are padded with an aqueous dispersions of the said dyestuffs and the dyestuffs are subsequently fixed at elevated temperature.

6. A process as claimed in claim 5, wherein the aqueous dispersion of the dyestuffs contains a thickening agent.

7. A process as claimed in claim 5, wherein the dyestuffs are fixed by steaming or treating them with dry heat at a temperature between about 100° and about 230°C.

8. A process as claimed in claim 1, wherein the fibrous materials are impregnated with the said dyestuffs from an organic solvent and dried, and the dyestuffs are subsequently fixed by a short-time action of heat.

9. A process as claimed in claim 1, wherein the dyestuffs are fixed by a short-time action of heat at a temperature of from about 180°C to about 210°C.

10. A process as claimed in claim 1, wherein the said fibrous materials are printed with water-containing preparations of the said dyestuffs and the dyestuffs are subsequently fixed by drying the prints and steaming them under atmospheric pressure or elevated pressure of up to 2.5 atmg or by a short-time action of hot air of about 180°C to about 210°C.

11. A process as claimed in claim 10, wherein the water-containing preparations of the dyestuffs contain a member selected from the group consisting of a thickening agent, a fixing accelerator and a combination thereof.

* * * * *